United States Patent
Raft (10) Patent No.: US 11,416,027 B2
(45) Date of Patent: Aug. 16, 2022

(54) POWER AND DATA HUB, COMMUNICATION SYSTEM, AND RELATED METHOD

(71) Applicant: GN HEARING A/S, Ballerup (DK)

(72) Inventor: Casper Silbo Raft, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 16/817,596

(22) Filed: Mar. 12, 2020

(65) Prior Publication Data
US 2020/0310506 A1 Oct. 1, 2020

(30) Foreign Application Priority Data

Mar. 28, 2019 (EP) .................................... 19166019

(51) Int. Cl.
| | |
|---|---|
| G06F 1/16 | (2006.01) |
| G06F 1/26 | (2006.01) |
| G06F 13/42 | (2006.01) |
| H01R 13/66 | (2006.01) |
| G06F 13/40 | (2006.01) |

(52) U.S. Cl.
CPC ............ *G06F 1/1632* (2013.01); *G06F 1/263* (2013.01); *G06F 13/4027* (2013.01); *G06F 13/4282* (2013.01); *H01R 13/6675* (2013.01); *G06F 1/266* (2013.01)

(58) Field of Classification Search
CPC ........ G06F 1/1632; G06F 1/189; G06F 1/263; G06F 1/266; G06F 13/4027; G06F 13/4282; H04R 13/6675; H04B 1/3877; H04B 12/10
See application file for complete search history.

(56) References Cited

U.S. PATENT DOCUMENTS 5,991,640 A 11/1999 Lilja et al.
9,800,083 B1 * 10/2017 Supper .................... H02J 7/025
(Continued)

FOREIGN PATENT DOCUMENTS

GB 2480668 A 11/2011

OTHER PUBLICATIONS

"JTAC-Tough™ Star-Pan™ Multiport power and data hubs for digitally aided close air support". 2017. Glenair, Inc. (Year: 2017).*
(Continued)

*Primary Examiner* — Thomas J. Cleary
(74) *Attorney, Agent, or Firm* — Vista IP Law Group, LLP (57) ABSTRACT

A communication system, A power and data hub and a method for operating a communication device is disclosed, the power and data hub comprising: a hub housing; a first primary interface configured to communicate with a radio unit to communicate primary audio, primary power input, and primary data; a second primary interface configured to communicate with a communication device to communicate and/or provide secondary audio and primary power output; a first secondary interface configured to communicate and/or provide secondary data and/or secondary power output with a first peripheral device connectable to the first secondary interface; a second secondary interface configured to communicate and/or provide secondary data and/or secondary power output with a second peripheral device connectable to the second secondary interface.

31 Claims, 3 Drawing Sheets

(56) References Cited

U.S. PATENT DOCUMENTS

| | | | |
|---|---|---|---|
| 10,575,084 B1* | 2/2020 | Supper | G10K 11/178 |
| 2002/0032042 A1 | 3/2002 | Poplawsky et al. | |
| 2010/0278348 A1* | 11/2010 | Yamkovoy | H04R 5/033 |
| | | | 381/58 |
| 2011/0003550 A1* | 1/2011 | Klinghult | G06F 3/0436 |
| | | | 455/41.3 |
| 2011/0012667 A1* | 1/2011 | Yamkovoy | H03K 5/1254 |
| | | | 327/434 |
| 2011/0013780 A1* | 1/2011 | Yamkovoy | H04R 29/00 |
| | | | 381/58 |
| 2011/0286608 A1 | 11/2011 | Hautier et al. | |
| 2013/0148818 A1* | 6/2013 | Yamkovoy | H04R 1/1041 |
| | | | 381/74 |
| 2013/0163776 A1* | 6/2013 | Yamkovoy | H04R 3/002 |
| | | | 381/72 |
| 2014/0079257 A1* | 3/2014 | Ruwe | H04S 7/304 |
| | | | 381/309 |
| 2014/0117921 A1* | 5/2014 | Suomela | H02J 7/342 |
| | | | 320/103 |
| 2014/0186807 A1* | 7/2014 | Rastatter | G09B 5/10 |
| | | | 434/169 |
| 2016/0344983 A1* | 11/2016 | Yoshimura | H04N 5/2252 |
| 2019/0033974 A1* | 1/2019 | Mu | G06F 3/016 |
| 2019/0243435 A1* | 8/2019 | Chou | G06F 1/266 |
| 2019/0273980 A1* | 9/2019 | Hardi | H04R 1/1016 |
| 2019/0356977 A1* | 11/2019 | Ooi | H04R 1/1033 |

OTHER PUBLICATIONS

Extended European Search Report dated Sep. 13, 2019 for EP Application No. 19166019.0.

Communication pursuant to Article 94(3) EPC dated Feb. 2, 2022 issued for EP 19166019.0.

O'Hara, A., "Review: Satechi USB-C Mobile Pro Hub adds useful ports but causes issues for early adopters," Apple Insider, dated Dec. 19, 2018.

* cited by examiner

Fig. 3

POWER AND DATA HUB, COMMUNICATION SYSTEM, AND RELATED METHOD

RELATED APPLICATION DATA

This application claims priority to, and the benefit of, European Patent Application No. 19166019.0 filed on Mar. 28, 2019. The entire disclosure of the above application is expressly incorporated by reference herein.

FIELD

The present disclosure relates to a power and data hub and a method of operating a power and data hub and a communication system comprising a power and data hub.

BACKGROUND

In combat and/or emergency situations, a user may be provided with a radio unit as well as a communication device, in order to enable users to utilize radio communication in high stress environments, where the communication device may be provided to allow for providing a hearing protection device, while still maintaining situational awareness.

Users in combat situations or other stressed environments may be asked to utilize peripheral devices, that may be intended to provide improved security and/or improved overview of a certain situation, where the peripheral device may e.g. be a helmet camera, a handheld tablet, data communication devices or similar peripheral devices. The provision of peripheral devices means that a user needs to provide the peripheral devices with both data communication and power, which may require the user might need a plurality of additional devices for providing both power and data to the peripheral devices, which will add to the weight of the gear.

SUMMARY

Accordingly, there is a need for methods and apparatus, which simplifies communication systems to be worn in combat situations or other stressed environments.

A power and a data hub is disclosed, the power and data hub comprising: a hub housing; a first primary interface configured to communicate with a radio unit to communicate primary audio, primary power input, and primary data; a second primary interface configured to communicate with a communication device to communicate secondary audio and primary power output; a first secondary interface configured to communicate and/or provide secondary data and/or secondary power output with a first peripheral device connectable to the first secondary interface; a second secondary interface configured to communicate and/or provide secondary data and/or secondary power output with a second peripheral device connectable to the second secondary interface.

Further, a communication system is disclosed, the communication system comprising: —a power and data hub according to the present disclosure; and a communication device connectable to the second primary interface of the power and data hub.

Also disclosed is a method of operating a power and data hub, the method comprising: communicating primary audio, primary power input, and primary data with a radio unit via a first primary interface of the power and data hub; communicating secondary audio and primary power output with a communication device via a second primary interface of the power and data hub; communicating secondary data and/or secondary power output with a first peripheral device via a first secondary interface of the power and data hub; and communicating secondary data and/or secondary power output with a second peripheral device via a second secondary interface of the power and data hub.

It is an important advantage of the power and data hub that the hub is capable of drawing both power and data from a radio unit, and distributing the power and/or data to peripheral devices while being capable of transmitting audio through the hub to and from a communication device for the user to communicate via the radio unit. The presence of the secondary interfaces means that the peripheral devices may be connected to the radio unit, and provide data communication and receive power from the radio unit, and thereby reducing the number of connections and/or interfaces that are needed to communicate directly with the radio unit.

The present disclosure provides a power and data hub, a method of operating a power and data hub, as well as a communication system where the connection to additional peripheral devices is improved.

The present disclosure allows for improved power and data communication via the radio unit, where complexity of the equipment carried by the user may be reduced significantly, to improve the user experience during combat, emergency or training operations.

Further, the present disclosure reduces the number of interfaces between a radio unit, a communication device and peripheral devices, as the first primary interface of the power and data hub is capable of providing the necessary data, power and audio via one interface, which is a similar and/or the same interface as a radio unit communicates the necessary power and audio with a communication interface.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A power and data hub for a communication device is disclosed, the power and data hub comprising: a hub housing; a first primary interface configured to communicate with a radio unit to communicate primary audio, primary power input, and primary data; a second primary interface configured to communicate with a communication device to communicate and/or provide secondary audio and primary power output; a first secondary interface configured to communicate and/or provide secondary data and/or secondary power output with a first peripheral device connectable to the first secondary interface; a second secondary interface configured to communicate and/or provide secondary data and/or secondary power output with a second peripheral device connectable to the second secondary interface.

The first primary interface may be adapted to provide a communication pathway for data, audio, and power between the radio unit and the power and data hub, where the power may be communicated to the communication device as well as the peripheral devices via the power and data hub via their respective interfaces. Thus, in one exemplary embodiment any and all of the devices that may be connected or connectable to the power and data hub may be capable of drawing power which is transmitted from the radio unit to the devices via the power and data hub.

The communication pathway for the data from the radio unit, via the first primary interface, to the power and data hub means that any peripheral device that has a data communication requirement may be capable of communicating data to and from the peripheral device to and from the radio unit via the power and data hub.

Furthermore, the first primary interface may also provide a communication pathway for audio communication to and from the communication device to the radio unit via the first primary interface.

Secondary data and/or secondary power may be seen as a source of data and/or power where the secondary data may be the same for one or more of the peripheral devices, or may be different for one or more of the peripheral devices, and where the secondary power may be the same for one or more of connected peripheral devices, or may be different for one or more of the peripheral devices. The term secondary data may be seen as meaning a secondary data output, where the secondary data output may vary from one secondary interface to another secondary interface. The term secondary power may be seen as meaning a secondary power output, where the secondary power output may vary from one secondary interface to another secondary interface, or may be the same. Thus, the secondary data and the secondary power may be defined as a first secondary data and a first secondary power of the first secondary interface, a second secondary data and a second secondary power of the second secondary interface, a third secondary data and a third secondary power of the third secondary interface, and/or a fourth secondary data and a fourth secondary power of the fourth secondary interface.

The radio unit used for armed forces, law enforcement, emergency services is often a radio unit that is capable of communicating both data and audio with a dispatch or a radio communication central, where an analog audio signal may be converted into a digital signal (data), where the data and the audio signal (digital and/or analog) may be transmitted and received via wireless communication to and from the radio unit. When the data and audio are transmitted, the data and the audio may be encrypted to ensure that the communication cannot be intercepted and/or overheard by unwanted parties. This means that if a user may be using a peripheral device that may transmit or receive sensitive information, it is advantageous to use the data communication channel of the radio unit to transmit encrypted data to a remote location.

Furthermore, in order to reduce the amount of equipment that a user has to carry during an operation, the peripheral devices and/or the communication device may be capable of drawing power from the radio unit, in order to reduce the need of separate batteries or power sources for one or more of the peripheral devices.

Thus, it may be desirable for the user to utilize the data communication capabilities of the radio unit to transmit data from a remote location and to utilize the power source of the radio unit, while maintaining a simple connection to the radio unit, and while maintaining the access to audio transmissions from the user to a remote location. Normally, the data interface for peripheral devices is connected to a data interface in a position on the radio unit which is different from the audio communication interface. Thus, when peripheral devices are connected to a radio unit, the data interface is in a first position on the radio unit, while a communication device is connected via a wired connection to a second position on the radio unit. Thus, the connectors and cables necessary to connect data and audio increase the physical size of the radio which reduce the mobility of the user during use.

A secondary interface, such as the first secondary interface and/or the second secondary interface, may provide an interface for a peripheral device, where the secondary interface may provide a power output for the peripheral device, and may provide a data communication between the peripheral device and the radio unit. Thus, if the peripheral device is a helmet camera, the secondary interface may be capable of providing operational power to the helmet camera, while the data communication link may allow the footage recorded by the helmet camera to be transmitted from the helmet camera to the radio unit, via the power and data hub, where the radio unit may transmit the data, containing the footage, to a remote location.

The second primary interface may provide a communication device with an interface to transmit audio communication from the communication device to the radio unit, via the power and data hub. The second primary interface may be a wired interface, where the communication device may be capable of receiving power to operate the communication device, as well as the audio communication capabilities.

This means that the power and data hub may provide the user with all the necessary communication and power capabilities using the second primary interface and one or more of the secondary interfaces, where the power and data hub is connected to the radio unit via the first primary interface.

The current disclosure provides for a simplified interface for data communications and power to be provided to peripheral devices, as the peripheral devices and the communication device are connected to a power and data hub, where the power and data hub provides the required data, power and audio communication capabilities which the user needs, and where the user can access all the capabilities of the radio unit via the power and data hub, as the power and data hub is connected via the first primary interface to the radio unit.

Within the context of the present disclosure the communication device may be or form a part of a hearing protection system, comprising a hearing protection device. The hearing protection device may comprise a first earpiece comprising a first transducer for provision of a first ear canal input signal and/or a first receiver for provision of a first audio output signal based on a first ear canal output signal. The hearing protection device may comprise a second earpiece comprising a second transducer for provision of a second ear canal input signal and/or a second receiver for provision of a second audio output signal based on a second ear canal output signal. The communication device may be connectable to the hearing protection device and comprise a processor and/or a mixer for processing the sound input received from the radio unit and/or the power and data hub, as well as the first ear canal input signal, and/or the second ear canal input signal. The hearing protection device may be connected or connectable to the second primary interface of the power and data hub, where the hearing protection device may be powered by the primary power output, and may communicate audio to/from the radio unit via the first primary interface and the second primary interface.

The communication system may comprise a communication device, a left receiver and a right receiver. The left receiver can be part of a left earpiece comprising a left connection, and the right receiver can be part of a right earpiece comprising a right connection. The connections may be wired connections or wireless connections such as Bluetooth connections.

The communication device may comprise a processor such as a central processing unit (CPU) or a digital signal processor (DSP); a radio interface for connection to a radio unit; an output interface; and a memory.

The primary audio and/or the secondary audio may be an analog audio signal communication from the radio unit towards the communication device, and vice versa.

In one or more exemplary power and data hubs, the power and data hub may comprise a third secondary interface configured to communicate and/or provide secondary data and secondary power output with a third peripheral device connectable to the third secondary interface. The power and data hub may comprise a fourth secondary interface configured to communicate and/or provide secondary data and secondary power output with a fourth peripheral device connectable to the fourth secondary interface.

The third secondary interface and/or the fourth secondary interface may provide an interface for a peripheral device, where the secondary interface may provide a power output (secondary power output) for the peripheral device, and may provide a data communication (secondary data) between the peripheral device and the radio unit. The third secondary interface and/or the fourth secondary interface may provide similar and/or identical functionality as the first secondary interface and/or the second secondary interface. The peripheral device may be one peripheral device that may be connected to any one of the secondary interfaces, or it may be a third peripheral device connected to the third secondary interface, a fourth peripheral device connected to a fourth secondary interface.

In one or more exemplary power and data hubs, the power and data hub may comprise a fifth or a subsequent secondary interface configured to communicate and/or provide secondary data and secondary power output with a fifth or a subsequent peripheral device connectable to the a fifth or a subsequent secondary interface.

In one or more exemplary power and data hubs, the power and data hub may comprise a first primary connector and a second primary connector, where the first primary connector may form the first primary interface, the second primary connector may form the second primary interface.

In one or more exemplary power and data hubs, the power and the data hub may comprise a first secondary connector and a second secondary connector, wherein, the first secondary connector may form the first secondary interface, and the second secondary connector may form the second secondary interface.

A connector, such as one or more of the first primary connector, the second primary connector, the first secondary connector, and the second secondary connector, may provide a male or a female connector for the power and data hub to be connected to the radio unit, the communication device and/or the peripheral device(s). The first primary connector may comprise at least 10 pins or terminals. The first primary connector may be a 19-pin connector. The connectors may be standardized connectors that may provide power audio and/or data communication capabilities, power and data communication capabilities, and/or power and audio communication capabilities. In case the power and data hub comprises a third secondary interface and/or a fourth secondary interface, the power and data hub may comprise a third secondary connector forming the third secondary interface and/or a fourth secondary connector forming the fourth secondary interface.

In one or more exemplary power and data hubs, the first secondary connector and/or the second secondary connector may be arranged in the hub housing. In one or more exemplary embodiments, all or any of the secondary connectors comprised by the power and the data hub may be arranged in the hub housing. By arranging one or more secondary connectors in the hub housing the user may connect a peripheral device directly to the hub housing, where the peripheral device may be connected via a third connector cable, where one end of the connector cable may be connected to the peripheral device, and the opposing end may comprise a connector that is adapted to mate with the one or more secondary connectors of the hub housing. Thus, the user may easily connect and/or disconnect a peripheral device from the power and data hub. The third connector cable may e.g. be provided with data and power transmission capabilities, allowing the peripheral device to communicate with the radio unit via the power and data hub.

In one or more exemplary power and data hubs, the power and data hub may comprise a first connector cable having a first proximal end and a first distal end, wherein the hub housing is arranged at the first proximal end and the first primary connector is arranged at the first distal end. The first connector cable may be configured to connect a radio unit with the power and data hub, where the first proximal end of the first connector cable provides a connection to the power and the data hub. The distal end of the connector cable may have a connector, where the connector may be configured to mate with a predetermined standard connector on the radio unit. The first connector cable may be configured to transmit power from the radio unit to the power and data hub, and/or may be configured to transmit data between the power and the data hub and the radio unit, and/or may be configured to transmit audio between the radio unit and the power and data hub.

In one or more exemplary power and data hubs, the power and data hub may comprise a first connector cable wherein the first connector cable may comprise the first secondary interface and the second secondary interface. This means that the first secondary interface and the second secondary interface, and/or the power and data hub, may be a part of the first connector cable. The first connector cable may be utilized to connect the radio unit with the communication device, where the power and the data hub may be positioned on the cable, in between the communication device and the radio unit. Thus, the power and data hub may be part of the connector cable.

In one or more exemplary power and data hubs, the power and data hub may comprise a first connector cable, wherein the first secondary interface and the second secondary interface may be comprised/arranged between the first proximal end and the first distal end. Thus, the power and the data hub and/or the first and/or second secondary interface may be positioned between the proximal end of the first connector cable and the distal end of the proximal end, where the proximal end may be connected to the radio unit and the distal end may be connected to the communication device.

In one or more exemplary power and data hubs, the power and data hub may comprise a second connector cable having a second proximal end and a second distal end, wherein the hub housing may be arranged at the second proximal end and the second primary connector may be arranged at the second distal end. The second connector cable may be configured to connect a radio unit with the power and data hub, where the second proximal end of the second connector cable provides a connection to the power and the data hub. The distal end of the second connector cable may have a connector, where the connector may be configured to mate with a predetermined standard connector on a communication device. The second connector cable may be configured to transmit power from the power and data hub to the communication device, and/or may be configured to transmit audio between the power and data hub and the communication device.

In one or more exemplary power and data hubs, the first primary interface may comprise an audio terminal, and/or a data terminal, and/or a power terminal, and/or a ground terminal. The ground terminal may be a signal ground terminal and may provide a reference point for signals that are communicated to the first primary interface. The ground terminal may be a common ground for one or more of the audio terminal, data terminal and/or the power terminal. The ground terminal may be split into separate ground terminals for audio, data and/or power, where each separate ground terminal provides a reference point for the audio, data and/or power, respectively.

In one or more exemplary power and data hubs, the second primary interface may comprise an audio terminal, a power terminal, and a ground terminal. The ground terminal may be a signal ground terminal and may provide a reference point for signals that are communicated to the second primary interface. The ground terminal may be a common ground for one or more of the audio terminal and/or the power terminal. The ground terminal may be split into separate ground terminals for audio and/or power, where each separate ground terminal provides a reference point for the audio and/or power, respectively.

In one or more exemplary power and data hubs, the first secondary interface may comprise a data terminal, a power terminal, and a ground terminal. The ground terminal may be a signal ground terminal and may provide a reference point for signals that are communicated to the first secondary interface. The ground terminal may be a common ground for one or more of the data terminal and/or the power terminal. The ground terminal may be split into separate ground terminals for data and/or power, where each separate ground terminal provides a reference point for the data and/or power, respectively.

In one or more exemplary power and data hubs, the power and data hub may comprise a first power interface configured to communicate secondary power input. The first power interface may be arranged in the hub housing. The first power interface may be adapted to provide secondary power input to the hub housing, where the secondary power input may be utilized to transmit power to the power and data hub, and where the secondary power input may be utilized to be incorporated in the primary power output and/or secondary power output, to provide secondary power to a peripheral device and/or the communication device, in order to preserve the primary power output from the radio unit. The first primary power interface may comprise a ground terminal and a power terminal. The power and the data hub may be configured to prioritize the power input, where the availability of the first primary power input may be utilized to reduce and/or turn off the power input via the first primary interface.

In one or more exemplary power and data hubs, the first primary interface and/or the second primary interface each may comprise a control terminal, and wherein the control terminal of the first primary interface is connected to the control terminal of the second primary interface. The control terminal may be a control interface which may be part of the first primary interface and/or the second primary interface. The control terminal may be utilized to transfer a control signal from the second primary interface to the first primary interface via the power and data hub, where the control signal may be utilized to transmit a control signal from the communication device to the radio unit. The control signal may be a Push-To-Talk control signal, that may be adapted to switch the radio from voice reception mode to transmit mode if the radio is a two-way radio. The push to talk control signal may be provided from the communication device, where the communication device may comprise a button that may send a binary control signal to the power and data hub and/or the radio unit, via the power and data hub.

In one or more exemplary power and data hubs, the audio terminal of the first primary interface may be connected to the audio terminal of the second primary interface. The audio of the first primary interface may be connected to the audio of the second primary interface. The connection of the audio between the first primary interface and the secondary power interface may be a direct connection, where the audio may be transmitted directly through the power and data hub, where the connection may be a wired connection from the first primary interface to the second primary interface. Alternatively, the audio connection may e.g. be filtered on the way between the first primary interface and the second primary interface. The audio connection between the first primary interface and/or the second primary interface may be an analog audio connection, where noise in the power and the data hub may contaminate and/or distort the audio signal, where an audio filter may improve the signal quality of the audio signal.

In one or more exemplary power and data hubs, the power and data hub may comprise a data management device configured to control communication of primary data to/from the first primary interface. The data management device may be a computer networking device which may provide a data network on the power and data hub. The data management device may connect devices, such as the peripheral devices, radio unit and/or the communication device, where the device may be configured to receive, process, and forward data to the destination device. The data management device may be any kind of data management device known in the art, that may be capable of receiving, transmitting and forwarding data from one device to the other, and to be able to distribute data packages to the correct device.

In one or more exemplary power and data hubs, the data management device may be configured to control communication of secondary data to/from the first secondary interface and the second secondary interface. The data management device may connect devices, such as the peripheral devices, radio unit and/or the communication device, where the device may be configured to receive, process, and forward data to the destination device.

In one or more exemplary power and data hubs, the power and data hub may comprise a power management device configured to control the primary power output and the secondary power output of the power and data hub. The power management device may be adapted to provide the necessary current and/or voltage to any device that may be connected to the power and data hub, where the power management device may be adapted to receive one or more power inputs, that may be distributed as necessary to devices that are connected to the power and data hub.

In one or more exemplary power and data hubs, the control of the primary power output and the secondary power output of the power and data hub may comprise to distribute the power input received via the first primary interface between the second primary interface, the first secondary interface, and the second secondary interface. The power input received via the first primary interface may be auxiliary power received from e.g. a battery pack, where the power and data hub may be configured to adapt the voltage and/or the current received from the primary and/or secondary power input to match the voltage and/or current requirements of a peripheral device and/or the communication device.

In one or more exemplary power and data hubs, the second primary interface may be configured to communicate tertiary data to a communication device. Thus, the tertiary data may provide data communication between the communication device and the radio unit and/or a peripheral device. The second primary interface may comprise an audio terminal, a data terminal, a power terminal, a control terminal and/or a ground terminal.

The disclosure also relates to a communication system comprising: a power and data hub according the present disclosure; and a communication device connectable to the second primary interface of the power and data hub.

The disclosure also relates to a method of operating a power and data hub, the method comprising: communicating primary audio, primary power input, and primary data with a radio unit via a first primary interface of the power and data hub; communicating secondary audio and primary power output with a communication device via a second primary interface of the power and data hub; communicating secondary data and secondary power output with a first peripheral device via a first secondary interface of the power and data hub; and communicating secondary data and secondary power output with a second peripheral device via a second secondary interface of the power and data hub.

Figure 1:
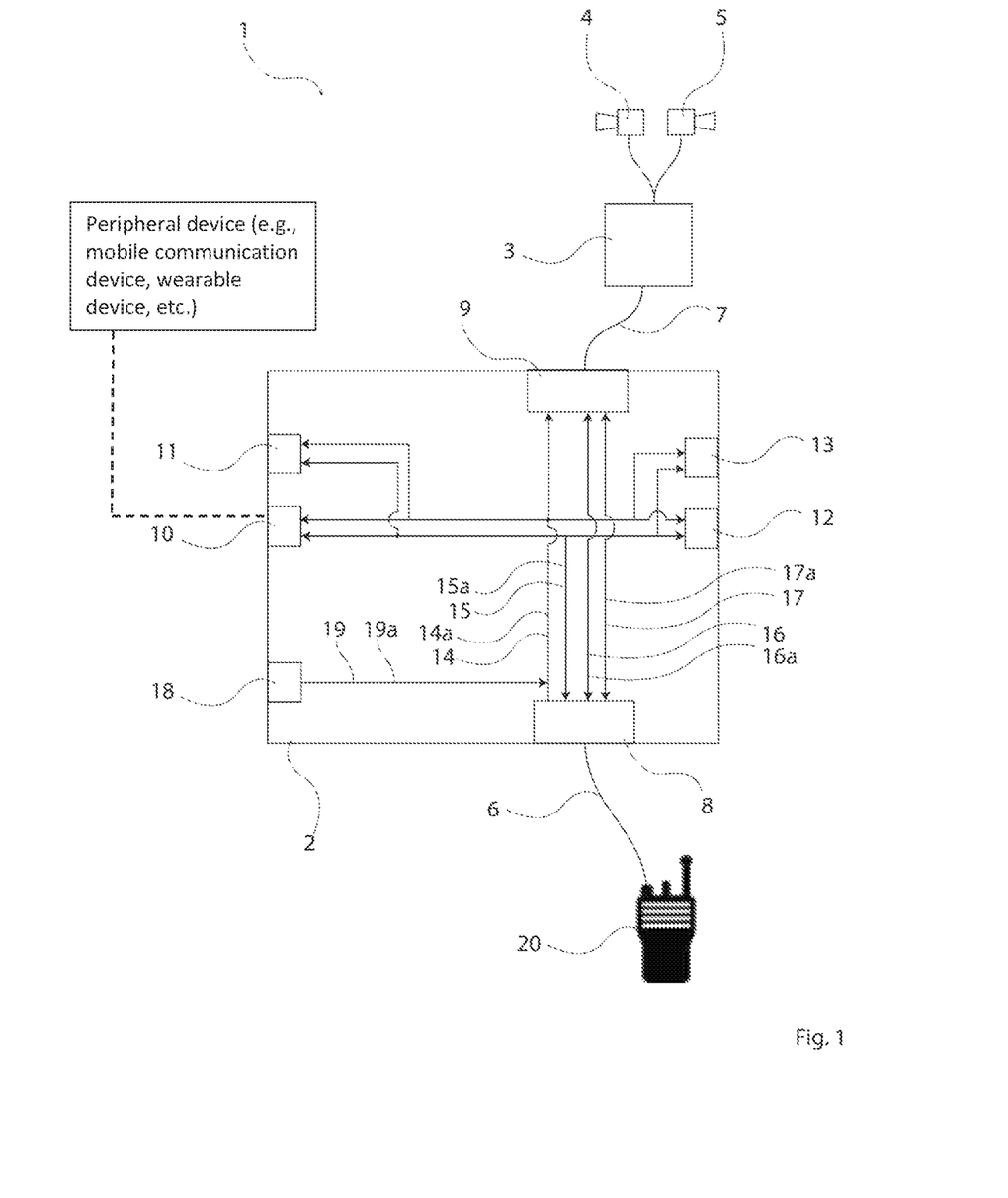
FIG. 1 shows a schematic block diagram of an exemplary communication system.

FIG. 1 shows a schematic block diagram of an exemplary communication system 1, where the communication system comprises a power and a data hub 2. The power and the data hub 2 comprises a first primary interface 8, where the first primary interface 8 is connected to a radio unit 20, via a first connector cable 6. The first connector cable 6 and the primary interface 8 may communicate data, power, audio as well as control signal(s) to and/or from the radio unit 20.

The first primary interface 8 provides a power 14 lead or wire, where power 14a may be distributed to the second primary interface 9, as well as the first 10, second 11, third 12 and/or fourth 13 secondary interfaces, where the power received in the first primary interface 8 may ensure that the first 10 and/or second 11 and/or third 12 and/or fourth 13 secondary interfaces may transmit power to peripheral devices that may be connected to any one of the first 10 and/or second 11 and/or third 12 and/or fourth 13 secondary interfaces. Furthermore, the power lead 14 may be adapted to provide power 14a to the second primary interface 9, where a communications device 3, may draw power 14a via a second connector cable 7, to power any components that may require power in the communication device 3, such as a processor, as well as a first receiver 4 and a second receiver 5, as well as components that may be utilized to attenuate and/or eliminate unwanted noise from the environment and/or enhance wanted sounds from the environment, and transmit a processed signal to the receivers 4, 5.

Additionally, if the user may need a secondary source (not shown) of power, the power and data hub 2 may be provided with a first power interface 18, where e.g. a battery pack may be connected to the first power interface 18 of the power and data hub 2 to provide auxiliary power 19a or secondary power input lead 19 to the power and data hub. The secondary power input lead 19 may be connected to the power lead 14 which may be a communication pathway of the power and data hub 2, where the secondary power input 19a may be communicated to the power 14a and thereby to the second primary interface 9, as well as the first 10 and/or second 11 and/or third 12 and/or fourth 13 secondary interfaces.

The first primary interface 8 provides a data 15 lead or wire, where data communication 15a may be distributed to the first 10 and/or second 11 and/or third 12 and/or fourth 13 secondary interfaces, where the data communication 15a, which may be transmitted and/or received via the first primary interface 8, may ensure that the first 10 and/or second 11 and/or third 12 and/or fourth 13 secondary interfaces may transmit data to peripheral devices which may be connected to any one of the first 10 and/or second 11 and/or third 12 and/or fourth 13 secondary interfaces. Thus, the power and data hub 2, may provide a data lead 15 from a peripheral device to the radio unit 20, allowing a peripheral device to share the data communication 15a capabilities of the radio unit 20.

The first primary interface 8 may be provided with an audio lead or wire 16, where an audio communication 16a may transmit audio signals to and from the first primary interface 8 to and from the second primary interface 9. Thus, when a communication device 3 is connected to the second primary interface, the audio 16a may be transmitted directly to and/or from the radio unit 20 to the communication device 3, via the first connector cable 6, the power and data hub 2 and the second connector cable 7. The audio 16a may be an analog audio signal, providing e.g. two-way communication via the radio unit 20. The audio lead 16 may be a direct communication pathway between the first primary interface 8 and the second primary interface 9, where in one example the audio lead 16 may be a direct connection between the two interfaces 8, 9, such as a direct wired connection.

The first primary interface 8 may be provided with a control connection 17, where the control 17 may transmit control signals 17a to and from the first primary interface 8 to and from the second primary interface 9. Thus, when a communication device 3 is connected to the second primary interface, the control 17a may be transmitted directly to and/or from the radio unit 20 to the communication device 3, via the first connector cable 6, the power and data hub 2 and the second connector cable 7. The control 17a may be an analog audio signal, providing e.g. push to talk communication between the communication device 3 and the radio unit 20. The control lead 17 may be a direct communication pathway between the first primary interface 8 and the second primary interface 9, where in one example the control lead 17 may be a direct connection between the two interfaces 8, 9, such as a direct wired connection.

Figure 2:
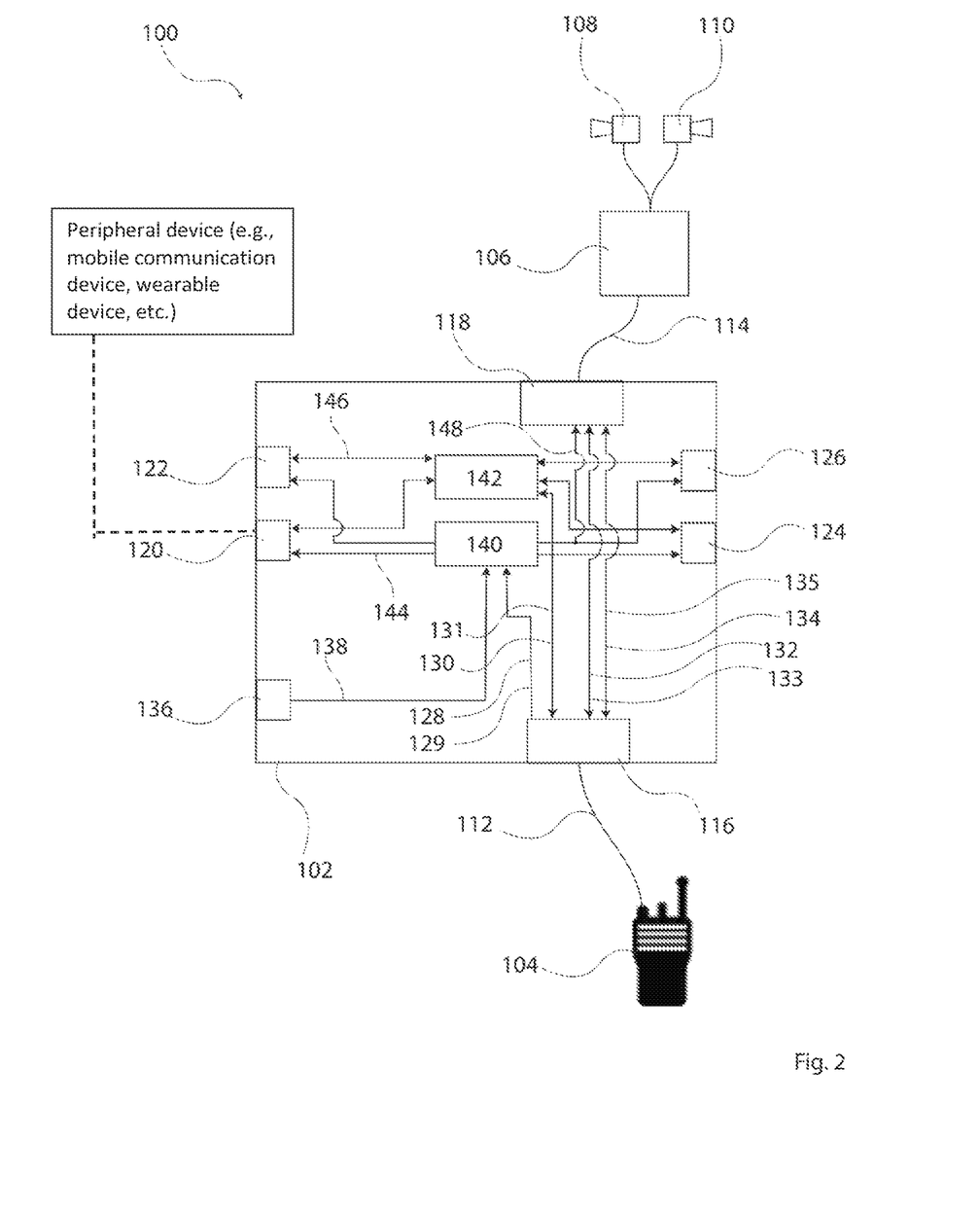
FIG. 2 shows a schematic block diagram of an exemplary communication system.

FIG. 2 shows a schematic block diagram of an exemplary communication system 100, where the power and data hub 102 has a similar functionality and provides the same inputs and outputs to peripheral devices, radio units and communication devices as the power and data hub 2 of FIG. 1.

The power and the data hub 102 comprises a power management device 140, where the power management device 140 may be provided with a power 130 from the first primary interface 116, and an optional secondary power input 138 from the first power interface 136, where the power management device may be adapted to convert and distribute power a secondary power output 144 to the secondary interfaces 120, 122, 124, 126 and/or the primary power output 148 to the second primary interface 118.

The power and the data hub 102 comprises a data management device 142, where the data management device 142 may be provided with a data lead 130 transmitting a primary data 131 from the first primary interface 116, where the data management device 142 may be adapted to convert and/or distribute a secondary data 146 to the secondary interfaces 120, 122, 124, 126.

The first primary interface 116 may be provided with an audio lead 132, where the audio lead 132 may transmit audio signals 133 to and from the first primary interface 116 to and from the second primary interface 118. Thus, when a communication device 106 is connected to the second primary interface, the audio 133 may be transmitted directly to and/or from the radio unit 20 to the communication device 106, via the first connector cable 112, the power and data hub 102 and the second connector cable 114. The audio 133 may be an analog audio signal, providing e.g. two-way communication via the radio unit 20. The audio 132 may be a direct communication pathway between the first primary interface 116 and the second primary interface 118, where in one example the audio lead 132 may be a direct connection between the two interfaces 116, 118, such as a direct wired connection.

The first primary interface 116 may be provided with a control lead 134, where the control lead 134 may transmit control signals 135 to and from the first primary interface 116 to and from the second primary interface 118. Thus, when a communication device 106 is connected to the second primary interface 118, the control 135 may be transmitted directly to and/or from the radio unit 104 to the communication device 106, via the first connector cable 112, the power and data hub 102 and the second connector cable 114. The control communication 135 may be an analog audio signal, providing e.g. push to talk communication between the communication device 106 and the radio unit 104. The control lead 134 may be a direct communication pathway between the first primary interface 116 and the second primary interface 118, where in one example the control lead 134 may be a direct connection between the two interfaces 116, 118, such as a direct wired connection.

Furthermore, the power management device 140 may be connected to second primary interface 118, where a communications device 106 may draw power 148 via a second connector cable 114, to power any components that may require power in the communication device 106, such as a processor, as well as a first receiver 108 and a second receiver 110, as well as components that may be utilized to attenuate and/or eliminate unwanted noise from the environment and/or enhance wanted sounds from the environment, and transmit a processed signal to the receivers 108, 110.

The left receiver 4, 108 may be part of a left earpiece and/or the right receiver 8, 116 can be part of a right earpiece 5, 110. The connection between the communication device 3, 106 and the left receiver 4, 108 and/or the left earpiece, and/or the right receiver 8, 116 and/or the left earpiece may be wired connections or wireless connections such as Bluetooth connections.

The communication device may comprise a processor such as a central processing unit (CPU) or a digital signal processor (DSP); a radio interface for connection to a radio unit; an output interface and a memory.

Figure 3:
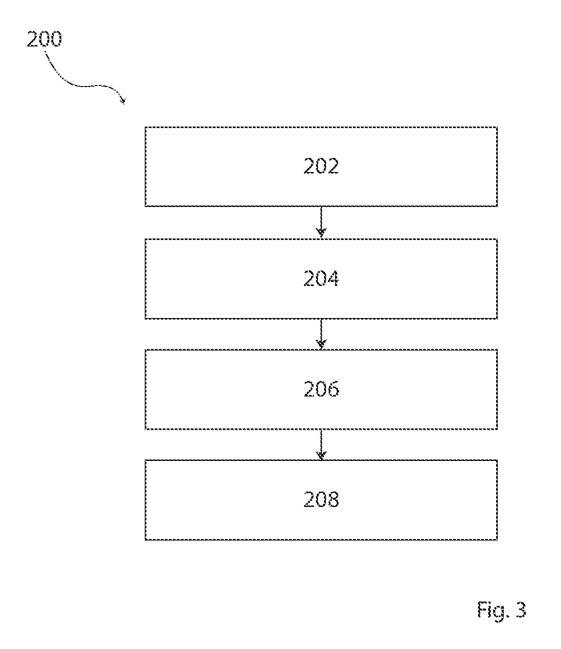
FIG. 3 shows a flow diagram of a method of operating a power and a data hub.

FIG. 3 shows a flow diagram of a method of operating a power and a data hub. The method of operating a power and data hub, the method comprising: communicating 202 primary audio, primary power input, and primary data with a radio unit via a first primary interface of the power and data hub; communicating 204 secondary audio and primary power output with a communication device via a second primary interface of the power and data hub; communicating 206 secondary data and secondary power output with a first peripheral device via a first secondary interface of the power and data hub; and communicating 208 secondary data and secondary power output with a second peripheral device via a second secondary interface of the power and data hub.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and/or some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

1. A power and data hub for a communication device, the power and data
   hub comprising:
   a hub housing;
   a first primary interface configured to communicate with a radio unit to communicate primary audio, primary power input, and primary data;
   a second primary interface configured to communicate with a communication device to communicate secondary audio and primary-power output;
   a first secondary interface configured to communicate secondary data and/or secondary power output with a first peripheral device connectable to the first secondary interface;
   a second secondary interface configured to communicate secondary data and/or secondary power output with a second peripheral device connectable to the second secondary interface.

2. Power and data hub according to item 1, the power and data hub comprising a third secondary interface configured to communicate secondary data and secondary power output with a third peripheral device connectable to the third secondary interface.

3. Power and data hub according to any of items 1-2, wherein the power and data hub comprises a first primary connector, a second primary connector, a first secondary connector, and a second secondary connector, wherein the first primary connector forms the first primary interface, the second primary connector forms the second primary interface, the first secondary connector forms the first secondary interface, and the second secondary connector forms the second secondary interface.

4. Power and data hub according to item 3, wherein the first secondary connector and the second secondary connector are arranged in the hub housing.

5. Power and data hub according to any of items 3-4, wherein the power and data hub comprises a first connector cable having a first proximal end and a first distal end, wherein the hub housing is arranged at the first proximal end and the first primary connector is arranged at the first distal end.

6. Power and data hub according to any of items 3-5, wherein the power and data hub comprises a second connector cable having a second proximal end and a second distal end, wherein the hub housing is arranged at the second proximal end and the second primary connector is arranged at the second distal end.

7. Power and data hub according to any of items 1-6, wherein the first primary interface comprises an audio terminal, a data terminal, a power terminal, and a ground terminal.

8. Power and data hub according to any of items 1-7, wherein the second-primary interface comprises an audio terminal, a power terminal, and a ground terminal.

9. Power and data hub according to any of items 1-8, wherein the first secondary interface comprises a data terminal, a power terminal, and a ground terminal.

10. Power and data hub according to any of items 1-9, wherein the power and data hub comprises a first power interface configured to communicate secondary power input.

11. Power and data hub according to any of items 1-10, wherein the first primary interface and the second primary interface each comprises a control terminal, and wherein the control terminal of the first primary interface is connected to the control terminal of the second primary interface.

12. Power and data hub according to any of items 1-11, as dependent on item 7 and 8, wherein the audio terminal of the first primary interface is connected to the audio terminal of the second primary interface.

13. Power and data hub according to any of items 1-12, wherein the power and data hub comprises a data management device configured to control communication of primary data to/from the first primary interface.

14. Power and data hub according to item 13, wherein the data management device is configured to control communication of secondary data to/from the first secondary interface and the second secondary interface.

15. Power and data hub according to any of items 1-14, wherein the hub comprises a power management device configured to control the primary power output and the secondary power output of the power and data hub.

16. Power and data hub according to item 15, wherein to control the primary power output and the secondary power output of the power and data hub comprises to distribute the power input received via the first primary interface between the second primary interface, the first secondary interface, and the second secondary interface.

17. A communication system comprising:
   a power and data hub according to any of items 1-16; and
   a communication device connectable to the second primary interface of the power and data hub.

18. Method of operating a power and data hub, the method comprising:
   communicating primary audio, primary power input, and primary data with a radio unit via a first primary interface of the power and data hub;
   communicating secondary audio and primary power output with a
   communication device via a second primary interface of the power and data hub;

communicating secondary data and secondary power output with a first peripheral device via a first secondary interface of the power and data hub; and communicating secondary data and secondary power output with a second peripheral device via a second secondary interface of the power and data hub.

LIST OF REFERENCES

1 Communication system
2 Power and Data hub
3 Communication device
4 Receiver
5 Receiver
6 First connector cable
7 Second connector cable
8 First primary interface
9 Second primary interface
10 First secondary interface
11 Second secondary interface
12 Third secondary interface
13 Fourth secondary interface
14 Power lead
14a Power
15 Data lead
15a Data
16 Audio Lead
16a Audio
17 Control lead
17a Control
18 First Power interface
19 Secondary power input
19a Secondary power
20 Radio unit
100 Communication system
102 Power and Data hub
104 Radio unit
106 Communication device
108 Receiver
110 Receiver
112 First connector cable
114 Second connector cable
116 First primary interface
118 Second primary interface
120 First secondary interface
122 Second secondary interface
124 Third secondary interface
126 Fourth secondary interface
128 Power lead
129 Power
130 Data lead
131 Data
132 Audio lead
133 Audio
134 Control lead
135 Control
136 First Power interface
138 Secondary power input
140 Power management device
142 Data management device
144 Secondary power output
146 Secondary data
148 Primary power output
200 Method of operating a power and a data hub
202 Communication
204 Communication
206 Communication
208 Communication

The invention claimed is:

1. A power and data hub for a communication device, the power and data hub comprising:
a hub housing;
a first primary interface configured to communicatively couple with a radio unit, wherein the first primary interface is configured to receive or provide primary audio, and to receive or provide primary data, wherein the radio unit is different from a mobile phone and a smartphone, and wherein the first primary interface is configured to obtain primary power input from the radio unit;
a second primary interface configured to communicatively couple with the communication device, wherein the second primary interface is configured to receive or provide secondary audio, and to provide primary power output; and
a first secondary interface configured to communicatively couple with a first peripheral device, wherein the first secondary interface is configured to receive first secondary data, and/or to provide first secondary power output;
wherein the first secondary interface is operatively connected to the first primary interface to allow communication of the first secondary data between the radio unit and the first peripheral device; and
wherein the first peripheral device comprises a mobile communication device or a wearable device, wherein the first peripheral device is configured to provide non-audio data as the first secondary data, and wherein the first secondary interface is configured to receive the non-audio data from the mobile communication device or the wearable device, and to pass the non-audio data downstream for output by the first primary interface to the radio unit, and wherein the first primary interface is configured to output the non-audio data to the radio unit for wireless transmission by the radio unit.

2. The power and data hub according to claim 1, wherein the first primary interface comprises a first primary connector, the second primary interface comprises a second primary connector, the first secondary interface comprises a first secondary connector.

3. The power and data hub according to claim 2, further comprising a first connector cable having a first proximal end and a first distal end, wherein the hub housing is at the first proximal end of the first connector cable, and the first primary connector is at the first distal end of the first connector cable.

4. The power and data hub according to claim 3, further comprising a second connector cable having a second proximal end and a second distal end, wherein the hub housing is at the second proximal end of the second connector cable, and the second primary connector is at the second distal end of the second connector cable.

5. The power and data hub according to claim 1, wherein the first primary interface comprises an audio terminal, a data terminal, a power terminal, and a ground terminal.

6. The power and data hub according to claim 1, wherein the first primary interface and the second primary interface each comprises a control terminal, and wherein the control terminal of the first primary interface is connected to the control terminal of the second primary interface.

7. The power and data hub according to claim 1, wherein the first primary interface comprises a first audio terminal, the second primary interface comprises a second audio terminal, and wherein the first audio terminal of the first primary interface is connected to the second audio terminal of the second primary interface.

8. The power and data hub according to claim 1, further comprising a data management device configured to control communication of the primary data to or from the first primary interface.

9. The power and data hub according to claim 8, wherein the data management device is configured to control communication of the first secondary data to or from the first secondary interface.

10. The power and data hub according to claim 1, further comprising a power management device configured to control the primary power output, and the first secondary power output, of the power and data hub.

11. The power and data hub according to claim 1, wherein the power and data hub is configured to distribute the primary power input received via the first primary interface between the second primary interface, and the first secondary interface.

12. The power and data hub according to claim 1, further comprising a second secondary interface configured to communicate second secondary data and/or second secondary power output with a second peripheral device connectable to the second secondary interface.

13. The power and data hub according to claim 12, further comprising a third secondary interface configured to communicate third secondary data and/or third secondary power output with a third peripheral device connectable to the third secondary interface.

14. The power and data hub according to claim 12, wherein the second secondary interface comprises a secondary connector.

15. The power and data hub according to claim 14, wherein the secondary connector is in the hub housing.

16. The power and data hub according to claim 1, wherein the first secondary interface is configured to provide at least some of the primary power input received from the radio unit as the first secondary power output for the first peripheral device.

17. The power and data hub according to claim 1, wherein the non-audio data comprises image data.

18. The power and data hub according to claim 1, wherein the power and data hub is configured to provide information for output to the first peripheral device.

19. The power and data hub according to claim 1, wherein the power and data hub is a combat gear, a law enforcement gear, or an emergency response gear.

20. The power and data hub according to claim 1, wherein the radio unit is configured to communicate with a dispatch center or a mission-based communication center.

21. A method of operating a power and data hub, comprising:
communicating primary audio, primary power input, and primary data between a radio unit and the power and data hub via a first primary interface of the power and data hub, the radio unit being different from a mobile phone and a smartphone;
communicating secondary audio and primary power output between a communication device and the power and data hub via a second primary interface of the power and data hub; and
receiving first secondary data from a first peripheral device via a first secondary interface of the power and data hub;
wherein the first secondary interface is operatively connected to the first primary interface to allow the first secondary data to be communicated between the radio unit and the first peripheral device;
wherein the first peripheral device comprises a mobile communication device or a wearable device, and wherein the first peripheral device is configured to provide non-audio data as the first secondary data;
wherein the act of receiving the first secondary data comprises receiving, by the first secondary interface, the non-audio data from the mobile communication device or the wearable device; and
wherein the method further comprises passing, by the first secondary interface, the non-audio data downstream for output by the first primary interface to the radio unit, wherein the non-audio data is outputted by the first primary interface to the radio unit for wireless transmission by the radio unit.

22. The method according to claim 21, further comprising providing information, by the power and data hub, for output to the first peripheral device.

23. The method according to claim 21, wherein the power and data hub is a combat gear, a law enforcement gear, or an emergency response gear.

24. The method according to claim 21, wherein radio unit is configured to communicate with a dispatch center or a mission-based communication center.

25. A power and data hub for a communication device, the power and data hub comprising:
a hub housing;
a first primary interface configured to communicate with a radio unit, the radio unit being different from a mobile phone and a smartphone;
a second primary interface configured to communicate with the communication device; and
a first secondary interface configured to communicate with a first peripheral device connectable to the first secondary interface;
wherein the first primary interface and the second primary interface are functionally connected to each other to transmit first audio received from the radio unit for output to the communication device, and to transmit second audio received from the communication device for output to the radio unit;
wherein the first primary interface is configured to receive data from the radio unit, wherein the data is different from the first audio and the second audio; and
wherein the first peripheral device comprises a mobile communication device or a wearable device, wherein the first peripheral device is configured to provide non-audio data, and wherein the first secondary interface is configured to receive the non-audio data from the mobile communication device or the wearable device, and to pass the non-audio data downstream for output by the first primary interface to the radio unit, and wherein the first primary interface is configured to output the non-audio data to the radio unit for wireless transmission by the radio unit.

26. The power and data hub according to claim 25, further comprising a second secondary interface configured to communicate with a second peripheral device connectable to the second secondary interface.

27. The power and data hub according to claim 25, wherein the communication device comprises a first receiver and a second receiver, and wherein the second primary interface is configured to provide the first audio for the first and second receivers of the communication device.

28. The power and data hub according to claim 25, wherein the first secondary interface is operatively connected to the first primary interface to transmit secondary data for communication between the radio unit and the first peripheral device.

29. The power and data hub according to claim 25, wherein the power and data hub is configured to provide information for output to the first peripheral device.

30. The power and data hub according to claim 25, wherein the power and data hub is a combat gear, a law enforcement gear, or an emergency response gear.

31. The power and data hub according to claim 25, wherein the radio unit is configured to communicate with a dispatch center or a mission-based communication center.

* * * * *